United States Patent [19]

Noguchi et al.

[11] Patent Number: 5,048,567
[45] Date of Patent: Sep. 17, 1991

[54] HYDRAULIC CONTROL VALVE

[75] Inventors: Masahiko Noguchi, Osaka; Tatsuro Motoyama, Kanagawa, both of Japan

[73] Assignees: Koyo Seiki Co., Ltd., Osaka; Mitsubishi Jidosha Kogyo Kabushiki Kaisha, Tokyo, both of Japan

[21] Appl. No.: 667,334

[22] Filed: Mar. 11, 1991

[30] Foreign Application Priority Data

Mar. 15, 1990 [JP] Japan ................... 2-66708

[51] Int. Cl.$^5$ .................. F15B 9/08; F16K 11/07
[52] U.S. Cl. .................. 137/625.23; 137/625.24; 137/625.68; 91/375 R
[58] Field of Search ............. 137/625.21, 625.22, 137/625.23, 625.24, 625.68, 625.69; 91/375 A, 375 R, 374

[56] References Cited

U.S. PATENT DOCUMENTS

| | | | |
|---|---|---|---|
| 4,452,274 | 6/1984 | Haga | 91/375 A |
| 4,516,471 | 5/1985 | Duffy | 91/375 A |
| 4,577,660 | 3/1986 | Haga | 91/375 A |

Primary Examiner—Alan Cohan
Attorney, Agent, or Firm—Mason, Fenwick & Lawrence

[57] ABSTRACT

A hydraulic control valve which comprises a casing having an oil inlet channel and an oil outlet channel and formed with groove portions and land portions arranged alternately in a specified direction, and a valve member having a return oil channel and attached to the casing so as to be movable relative thereto in the specified direction, the valve member having groove portions and land portions arranged alternately in the specified direction, the groove portions and the land portions of the casing being opposed to the land portions and the groove portions of the valve member respectively when the valve is in a neutral state, permitting oil supplied from the oil inlet channel to flow into the return oil channel, the valve member being movable from the neutral state relative to the casing for the land portions of the casing and the valve member to block communication between the oil inlet channel and the return oil channel to permit the oil supplied from the oil inlet channel to flow into the oil outlet channel. The land portion of the casing or the valve member is formed with a recess for permitting the oil supplied from the oil inlet channel to flow therethrough into the return oil channel when the amount of movement of the valve member from the neutral state relative to the casing becomes greater than a predetermined valve.

3 Claims, 4 Drawing Sheets

HYDRAULIC CONTROL VALVE

BACKGROUND OF THE INVENTION

The present invention relates to hydraulic control valves, for example, for use in hydraulic power steering devices for motor vehicles.

Motor vehicles, especially trucks and like large-sized vehicles, are equipped with a hydraulic power steering device for assisting the driver in the steering force. Such power steering devices generally have a hydraulic cylinder for assisting in the steering force, and a rotary-type or spool-type hydraulic control valve for changing the direction of pressure oil to be supplied thereto according to the steering direction (see Unexamined Japanese Patent Publication SHO 64-22676 and Examined Japanese Patent Publication SHO 57-61620). FIGS. 10 to 12 show an example of conventional rotary-type hydraulic control valve.

With reference to FIG. 10, the hydraulic control valve comprises a cylindrical casing 1, and a cylindrical valve member 2 fitted in the casing 1 and rotatable about the axis thereof.

When the hydraulic control valve is used for a power steering device of the rack-pinion type, the casing 1 is rotatably supported by the casing of the steering device although not shown. The valve member 2 is formed at the lower end of an input shaft connected to the steering wheel. The casing 1 is secured to the upper end of an output shaft connected to the pinion shaft. The input shaft and the output shaft are interconnected by a torsion bar 60 so as to be twistable relative to each other.

The inner periphery of the casing 1 is formed with eight rectangular groove portions 4, 5 and eight rectangular land portions 6, 7 extending axially of the casing and arranged alternately circumferentially thereof as will be described below. Four first land portions 6 are formed at positions dividing the circumference of the inner periphery of the casing 1 into four equal portions, and four second land portions 7 are formed between the first land portions. Four first groove portions 4 are formed clockwise adjacent to the respective first land portions 6. Four second groove portions 5 are formed counterclockwise adjacent to the first land portions 6, respectively. The outer periphery of the valve member 2 is formed with eight rectangular groove portions 8, 9 and eight rectangular land portions 10, 11 extending axially of the member and arranged alternately circumferentially thereof in the following manner. Four first groove portions 8 are formed at positions dividing the circumference of the outer periphery of the valve member 2 into four equal portions and are opposed to the respective first land portions 6 of the casing 1, and four second groove portions 9 are formed between the first groove portions 8 and opposed to the respective second land portions 7 of the casing 1. Clockwise adjacent to the first groove portions 8, four first land portions 10 are provided as opposed to the respective first groove portions 4 of the casing 1. Counterclockwise adjacent to the first groove portions 8, four second land portions 11 are provided as opposed to the second groove portions 5 of the casing 1.

Although not shown, the inner periphery of housing of the power steering device in contact with the outer periphery of the casing 1 is formed with three independent annular grooves. Formed in the casing 1 are four radial oil inlet ports (oil inlet channels) 12 extending through the respective first land portions 6 from the inner periphery to the outer periphery, four first oil outlet ports (oil outlet channels) 13 extending through the respective first groove portions 4 from the bottom thereof to the outer periphery, and four second oil outlet ports (oil outlet channels) 14 extending through the respective second groove portions 5 from the bottom thereof to the outer periphery. The oil inlet port 12, the first oil outlet port 13 and the second oil outlet port 14 are positioned as displaced from one another axially of the casing. Through the first of the annular grooves of the steering device housing, the four oil inlet ports 12 are in communication with a hydraulic pump (not shown) which is driven by an engine. Through the second annular groove of the housing, the four first oil outlet ports 13 communicate with a first oil chamber of a hydraulic cylinder (not shown) for assisting in the steering force. Via the third annular groove of the housing, the four second oil outlet ports 14 communicate with a second oil chamber of the hydraulic cylinder. The cylinder has a piston secured to a rack bar. When supplied with pressure oil to the first oil chamber, the hydraulic cylinder produces a rightward steering force. The supply of pressure oil to the second oil chamber produces a leftward steering force.

A first return oil bore (return oil channel) 15 extends through the center of the valve member 2 axially thereof and is in communication with the four second groove portions 9 through four radial second return oil bores (return oil channels) 16. Although not shown, the first return oil bore 15 communicates with an oil tank. The torsion bar 60 interconnecting the input shaft and the output shaft extends through the first return oil bore 15.

While the steering wheel is not manipulated, the torsion bar 60 is free of torsion, with the input shaft and the output shaft, i.e., the hydraulic control valve, in a neutral state. This state is illustrated in FIG. 10, in which the first land portions 6 of the casing 1 are opposed to the first groove portions 8 of the valve member 2, respectively, the second land portions 7 of the casing 1 to the second groove portions 9 of the valve member 2, the first groove portions 4 of the casing 1 to the first land portions 10 of the valve member 2, and the second groove portions 5 of the casing 1 to the second land portions 11 of the valve member 2. There is a clearance between each of the first land portions 6 and the second land portions 7 of the casing 1 and each of the valve member first land portion 10 and second land portion 11 on opposite sides thereof. The oil supplied to each oil inlet port 12 from the hydraulic pump enters the first groove portion 8 of the valve member 2, flows through the casing first groove portion 4 and second groove portion 5 on opposite sides thereof, through the valve member second groove portions 9 on opposite sides thereof and further through the second retrun oil bores 16 of these portions, enters the first return oil bore 15 and returns to the tank. Accordingly, no pressure oil is supplied to the hydraulic cylinder, permitting the rack bar to remain in a neutral state and the motor vehicle in a straight running state.

When the steering wheel is turned rightward, the torsion bar 60 is twisted, slightly rotating the valve member 2 clockwise relative to the casing 1 as seen in FIG. 11. As a result, the first land portion 10 and the second land portion 11 of the valve member 2, and the second land portion 7 and the first land portion 6 of the casing 1 block communication between the first groove portion 8 of the valve member 2 and the second groove portions 9 on opposite sides thereof, with the first groove portion 8 of the valve member 2 in communication with the first groove portion 4 of the casing 1 and with the second groove portions 9 of the valve member 2 in communication with the second groove portions 5 of the casing 1. The oil supplied from the oil inlet port 12 to the first groove portion 8 of the valve member 2 is fed to the first oil chamber of the hydraulic cylinder via the first groove portion 4 of the casing 1 and the first oil outlet port 13. On the other hand, the oil in the second oil chamber of the hydraulic cylinder flows out through each second oil outlet port 14 into the second groove portion 5 of the casing 1, passes through the second groove portion 9 and the second return oil bore 16 of the valve member 2 into the first return oil bore 15 and returns to the tank. Consequently, the rack bar moves in a direction to produce a rightward steering force and steers the motor vehicle rightward.

Conversely when the steering wheel is turned leftward, the torsion bar 60 is twisted in a direction opposite to the above, slightly rotating the valve member 2 counterclockwise relative to the casing 1 as shown in FIG. 12. Consequently, the first land portion 10 and the second land portion 11 of the valve member 2, and the first land portion 6 and the second land portion 7 of the casing 1 block communication between the first groove portion 8 of the valve member 2 and the second groove portions 9 on opposite sides thereof, with the first groove portion 8 of the valve member 2 in communication with the second groove portion 5 of the casing 1 and with the second groove portions 9 of the valve member 2 in communication with the first groove portions 4 of the casing. The oil from the oil inlet portion 12 to the first groove portion 8 of the valve member 2 is fed to the second oil chamber of the hydraulic cylinder via the second groove portion 5 of the casing 1 and the second oil outlet port 14. On the other hand, the oil in the first oil chamber of the hydraulic cylinder flows out through each first oil outlet port 13 into the first groove portion 4 of the casing 1, passes through the second groove portion 9 and the second return oil bore 16 of the valve member 2 into the first return oil bore 15 and returns to the tank. Accordingly, the rack bar moves in a direction to produce a leftward steering force and steers the motor vehicle leftward.

In the case of the power steering device provided with the hydraulic control valve described above, the rack bar of the hydraulic cylinder remains subjected to the hydraulic assisting steering force if the steering wheel is held turned rightward or leftward to a limit position. The assisting steering force is great especially in the case of trucks or large-sized vehicles, so that the linkage of the steering device is likely to break when the steering wheel is held as turned to the limit position.

As a countermeasure against this problem, a hydraulic power steering device has been proposed which is adapted to interrupt a high hydraulic pressure at the stroke end of piston of the hydraulic cylinder (see Unexamined Japanese Utility Model Publication SHO 60-122277). In actuality, however, it is likely that a maximum of assisting steering force will be maintained to break the linkage if the wheel falls into a trench or the vehicle is steered on a bad road even when the steering wheel is not turned to the limit. Thus, the problem remains unsolved since the proposed device is not adapted to interrupt the high hydraulic pressure unless the piston of the hydraulic cylinder is moved to the stroke end.

The same problem as above is also encountered with the power steering device having a hydraulic control valve of the conventional spool type.

SUMMARY OF THE INVENTION

The main object of the present invention is to provide a hydraulic control valve wherein the supply of pressure oil is interrupted when the valve member has moved beyond a certain extent relative to the casing to prevent, for example, the break of the linkage of the power steering device.

The present invention provides a hydraulic control device which comprises a casing having an oil inlet channel and an oil outlet channel and formed with groove portions and land portions arranged alternately in a specified direction, and a valve member having a return oil channel and attached to the casing so as to be movable relative thereto in the specified direction, the valve member having groove portions and land portions arranged alternately in the specified direction, the groove portions and the land portions of the casing being opposed to the land portions and the groove portions of the valve member respectively when the valve is in a neutral state, permitting oil supplied from the oil inlet channel to flow into the return oil channel, the valve member being movable from the neutral state relative to the casing for the land portions of the casing and the valve member to block communication between the oil inlet channel and the return oil channel to permit the oil supplied from the oil inlet channel to flow into the oil outlet channel, the hydraulic control valve being characterized in that the land portion of the casing or the valve member is formed with a recess for permitting the oil supplied from the oil inlet channel to flow therethrough into the return oil channel when the amount of movement of the valve member from the neutral state relative to the casing becomes greater than a predetermined value.

The casing is in the form of a cylinder having the groove portions and the land portions formed on its inner periphery and extending axially thereof. The valve member is in the form of a cylinder fitted in the casing and rotatable about its axis and has the groove portions and the land portions formed on its outer periphery and extending axially thereof.

Alternatively, the casing is in the form of a cylinder, and the groove portions and the land portions are annular and formed on its inner periphery. The valve member is in the form of a cylinder fitted in the casing and movable axially thereof. The outer periphery of the valve member may have annular groove portions and land portions.

When the valve member has moved beyond a certain extent relative to the casing, the oil supplied from the oil inlet channels returns to the return oil channels via the recesses formed in the land portions of the casing or the valve member, whereby a larger amount of pressure oil is prevented from being supplied to the oil outlet channels.

Accordingly, if a steering force greater than a certain value acts on the power steering device for which the hydraulic control valve is used, the supply of oil of high pressure to the hydraulic cylinder is interrupted to preclude a further increase in the hydraulic pressure and thereby prevent the break of the linkage.

BRIEF DESCRIPTION OF THE DRAWINGS

FIG. 1 is a fragmentary view in cross section showing the same in a neutral state;

FIG. 2 is a fragmentary view in cross section showing the same with a valve member slightly rotated rightward;

FIG. 3 is a fragmentary view in cross section showing the same with the valve member greatly rotated rightward;

FIG. 4 is a fragmentary view in cross section showing the same in a neutral state;

FIG. 5 is a fragmentary view in cross section showing the same with a valve member slightly rotated rightward;

FIG. 6 is a fragmentary view in cross section showing the same with the valve member greatly rotated rightward;

FIG. 7 is a view in longitudinal section of the same in a neutral state;

FIG. 8 is a view in longitudinal section of the same with a valve member slightly moved rightward;

FIG. 9 is a view in longitudinal section of the same with the valve member greatly moved rightward;

FIG. 10 is a cross sectional view of the same in a neutral state;

FIG. 11 is a cross sectional view of the same with a valve member slightly rotated rightward; and FIG. 12 is a cross sectional view of the same with the valve member slightly rotated leftward.

DESCRIPTION OF THE PREFERRED EMBODIMENTS

Figure 1:
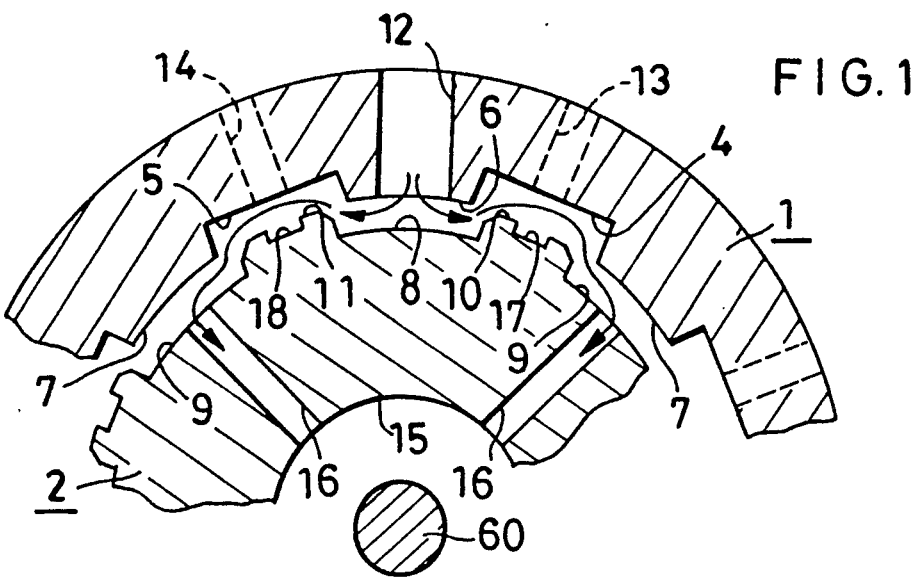
FIGS. 1 to 3 show an embodiment of rotary-type hydraulic control valve according to the invention.

With reference to FIGS. 1 to 9, several embodiments of the present invention will be described below. Although these embodiments are adapted for use with power steering devices for motor vehicles, the invention is not limited to hydraulic control valves for power steering devices. In the following description, the parts the same as the respective corresponding parts of the conventional valve are each designated by the same corresponding reference numeral. Further throughout the embodiments, like parts are designated by like reference numerals.

Embodiment 1

Figure 2:
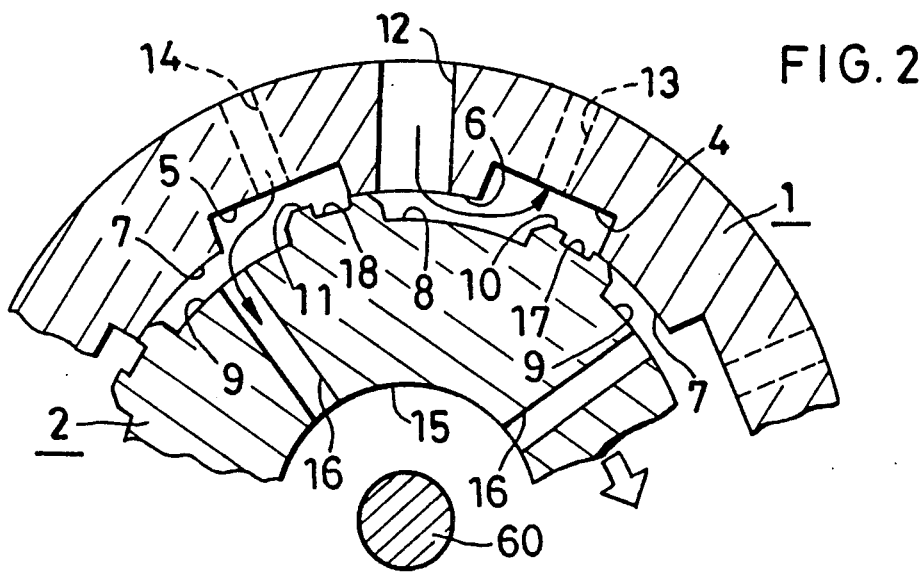
Figure 3:
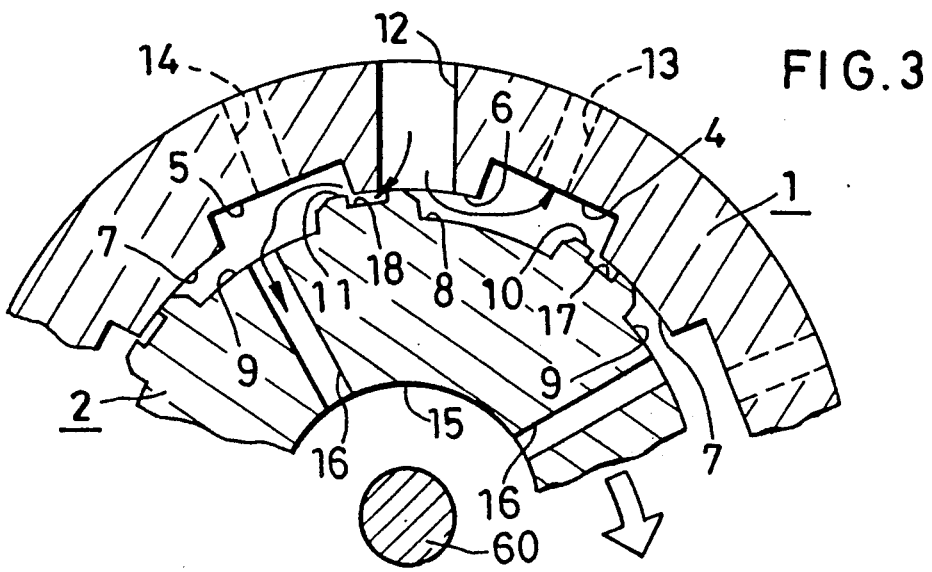

This embodiment is a rotary-type hydraulic control valve and is shown in FIGS. 1 to 3.

In this case, the valve member 2 has two kinds of land portions 10, 11 which are formed with groovelike recesses 17, 18 extending axially of the member. The circumferential width of the recesses 17, 18 is slightly larger than the width of the first land portion 6 of the casing 1 from its circumferential opposite ends to the oil inlet port 12. With the exception of the above feature, the embodiment is the same as the conventional valve.

Figure 10:
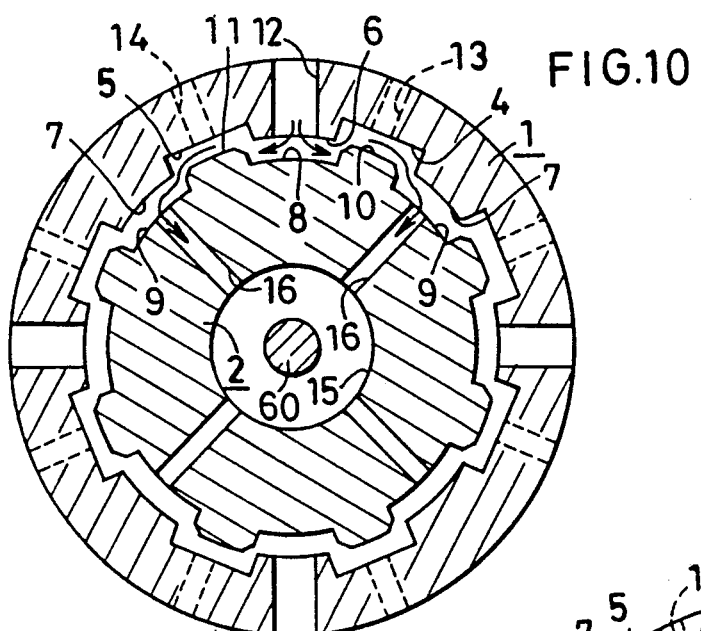
FIGS. 10 to 12 show a conventional hydraulic control valve of the rotary type.

FIG. 1 shows the valve in its neutral state. In this state, the valve operates in the same manner as the conventional valve as illustrated in FIG. 10.

Figure 11:
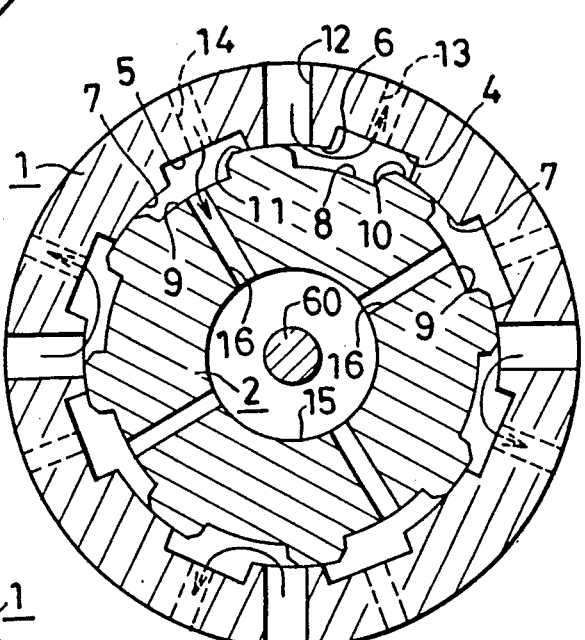
Figure 12:
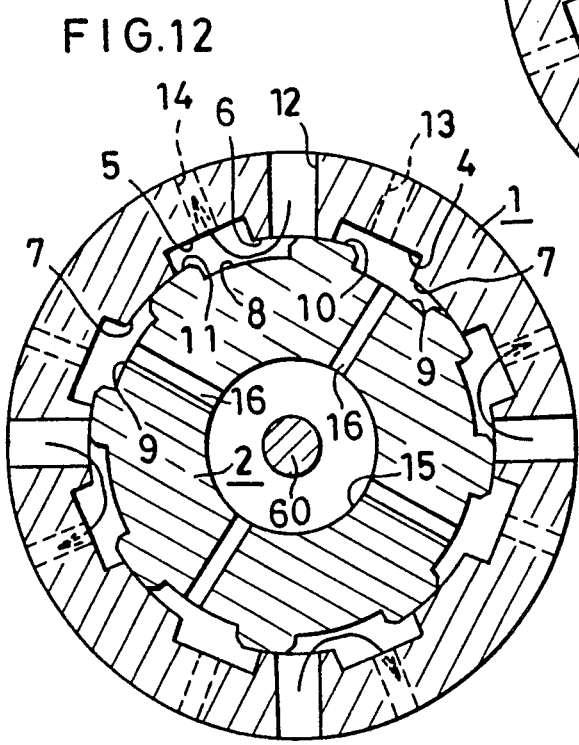

FIG. 2 shows the state when the steering wheel has been slightly turned rightward. In this state, the valve operates also in the same manner as the conventional valve as illustrated in FIG. 11.

FIG. 3 shows the valve when the steering wheel is further turned, for example, with the vehicle wheel trapped in a ditch. Upon the wheel falling into the ditch, great steering resistance (surface resistance) acts and exceeds the greatest assisting steering force, whereupon power steering is changed over to manual steering. When the steering wheel is further turned rightward in this state, the torsion bar 60 is further twisted, further rotating the valve member 2 clockwise relative to the casing 1 and moving the recess 18 in each second land portion 11 of the valve member 2 to the position of the oil inlet port 12 of the casing 1. The pressure oil supplied to the oil inlet port 12 partly enters the second groove portion 5 of the casing 1 through the recess 18, flows through the second groove portion 9, the second return oil bore 16 and the first return oil bore 15 of the valve member and returns to the tank. Consequently, the pressure of oil to be supplied to the first oil chamber of the hydraulic cylinder drops below a predetermined relief pressure to diminish the assisting steering force. This precludes the linkage from breaking.

The valve operates in the same manner as above when the steering wheel is turned leftward.

Embodiment 2

Figure 4:
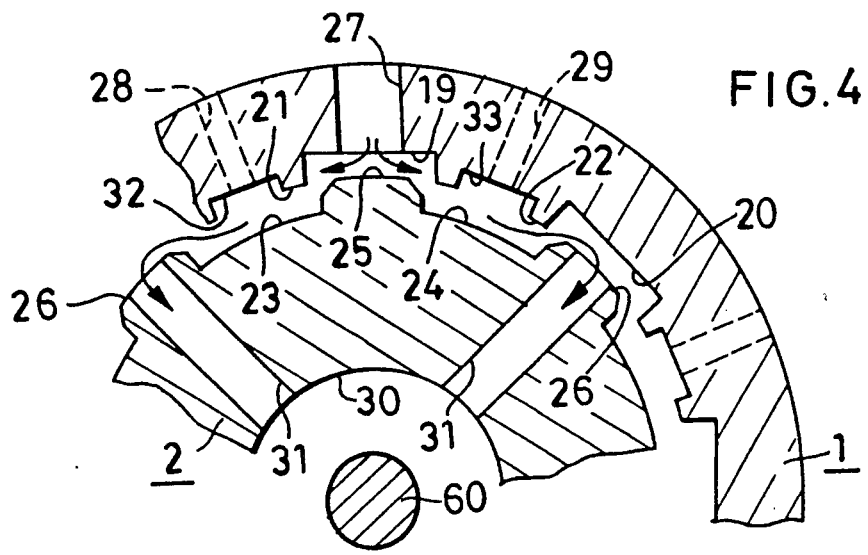
FIGS. 4 to 6 show another embodiment of rotary-type hydraulic control valve.
Figure 5:
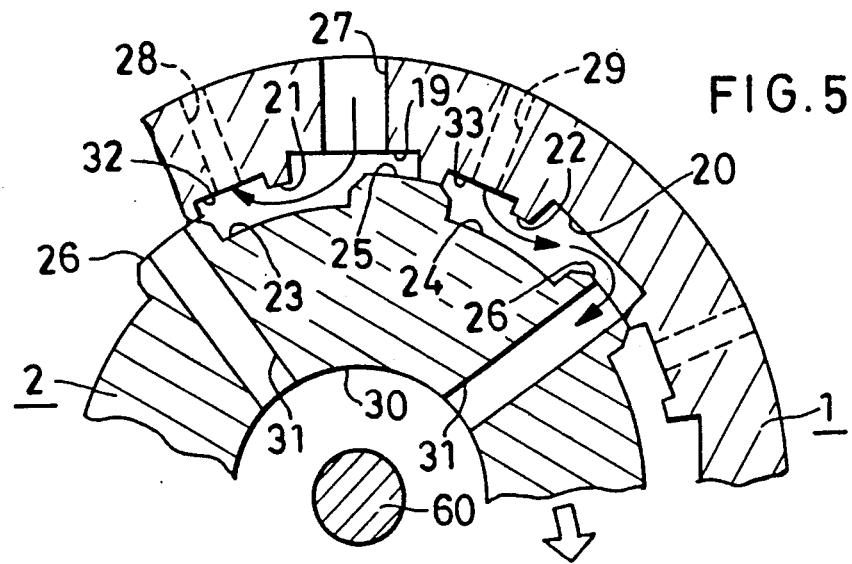
Figure 6:
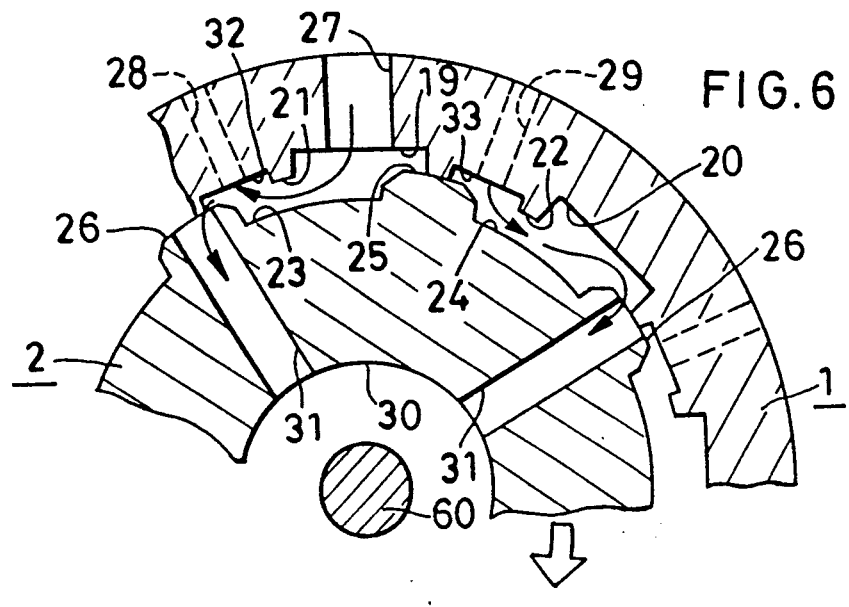

This embodiment is also a hydraulic control valve of the rotary type, which is shown in FIGS. 4 to 6. Like the embodiment 1, this hydraulic control valve comprises a cylindrical casing 1 and a cylindrical valve member 2.

The casing 1 is formed in its inner periphery with four first groove portions 19 and four second groove portions 20 which are arranged alternately circumferentially of the casing. Formed between these portions are four first land portions 21 and four second land portions 22 which are arranged alternately in the circumferential direction. Formed in the outer periphery of the valve member 2 and arranged alternately circumferentially thereof are four first groove portions 23 opposed to the first land portions 21 of the casing 1 and four second groove portions 24 opposed to the second land portions 22 of the casing 1. Four first land portions 25 opposed to the first groove portions 19 of the casing 1 and four second land portions 26 opposed to the second groove portions 20 of the casing 1 are formed on the valve member 2 between these groove portions and arranged alternately in the circumferential direction.

The casing 1 has four radial oil inlet ports (oil inlet channels) 27 extending from the bottoms of the respective first groove portions 19 to the outer periphery of the casing, four first oil outlet ports (oil outlet channels) 28 extending through the respective first land portions 21 from the inner periphery to the outer periphery, and four second oil outlet ports (oil outlet channels) 28 extending through the respective second land portions 22 from the inner periphery to the outer periphery.

A first return oil bore (return oil channel) 30 extends through the center of the valve member 2 axially thereof. Four radial second return oil bores (return oil channels) 31 extend from the oil bore 30 to the outer surfaces of the four second land portions 26.

The casing 1 has groovelike recesses 32, 33 extending axially thereof and formed in the inner surfaces of the first land portions 21 and the second land portions 22.

The circumferential width of these recesses 32, 33 is larger than the diameter of the first and second oil outlet ports 28, 29.

The embodiment 2 is the same as the embodiment 1 with the exception of the above features.

FIG. 4 shows the valve in a neutral state.

In this state, the first groove portions 19 of the casing 1 are opposed to the first land portions 25 of the valve member 2, respectively, the second groove portions 20 of the casing 1 to the second land portions 26 of the valve member 2, the first land portions 21 of the casing 1 to the first groove portions 23 of the valve member 2, and the second land portions 22 of the casing 1 to the second groove portions 24 of the valve member 2. There is a clearance between each of the first land portions 21 and the second land portions 22 of the casing 1 and each of the valve member first land portion 25 and second land portion 26 on opposite sides thereof. The oil supplied to each oil inlet port 27 from the hydraulic pump enters the first groove portion 19 of the casing 1, flows through the valve member first groove portion 23 and second groove portion 24 on opposite sides thereof, through the casing second groove portions 29 on opposite sides thereof and further through the second return oil bores 31 of these portions, enters the first return oil bore 30 and returns to the tank. Accordingly, no pressure oil is supplied to the hydraulic cylinder, permitting the rack bar to remain in a neutral state and the motor vehicle in a straight running state.

FIG. 5 shows the state when the valve member 2 is slightly rotated clockwise relative to the casing 1 by slightly turning the steering wheel rightward.

In this state, the first land portion 25 and the second land portion 26 of the valve member 2, and the second land portion 22 and the first land portion 21 of the casing block communication between the first groove portion 19 of the casing 1 and the second groove portion 24 of the valve member 2 and between the first groove portion 23 of the valve member 2 and the second groove portion 20 of the casing 1, the first groove portion 19 of the casing 1 is in communication with the first groove portion 23 of the valve member 2, and the second groove portion 20 of the casing 1 is in communication with the second groove portion 24 of the valve member 2. The oil supplied from the oil inlet port 27 to the first groove portion 19 of the casing 1 is fed to the first oil chamber of the hydraulic cylinder via the first groove portion 23 of the valve member 2 and the first oil outlet port 28. On the other hand, the oil in the second oil chamber of the hydraulic cylinder flows out through each second oil outlet port 29 into the second groove portion 24 of the valve member 2, passes through the second groove portion 20 of the casing 1 and the second return oil bore 31 into the first return oil bore 30 and returns to the tank. Consequently, the rack bar moves in a direction to produce a rightward steering force and steers the motor vehicle rightward.

FIG. 6 shows the valve when the steering wheel is further turned, for example, with the vehicle wheel trapped in a ditch, to further rotate the valve member 2 clockwise relative to the casing 1.

At this time, the second return oil bore 31 of the second land portion 26 of the valve member 2 is moved into communication with the recess 32 of the first land portion 21 of the casing 1. The pressure oil supplied to the oil inlet port 27 partly flows into the second return oil bore 31 of the valve member 2 through the recess 32 and returns to the tank through the first return oil bore 30. Consequently, the pressure of oil to be supplied to the first oil chamber of the hydraulic cylinder drops below a predetermined relief pressure to diminish the assisting steering force.

The valve operates in the same manner as above when the steering wheel is turned leftward.

Embodiment 3

Figure 7:
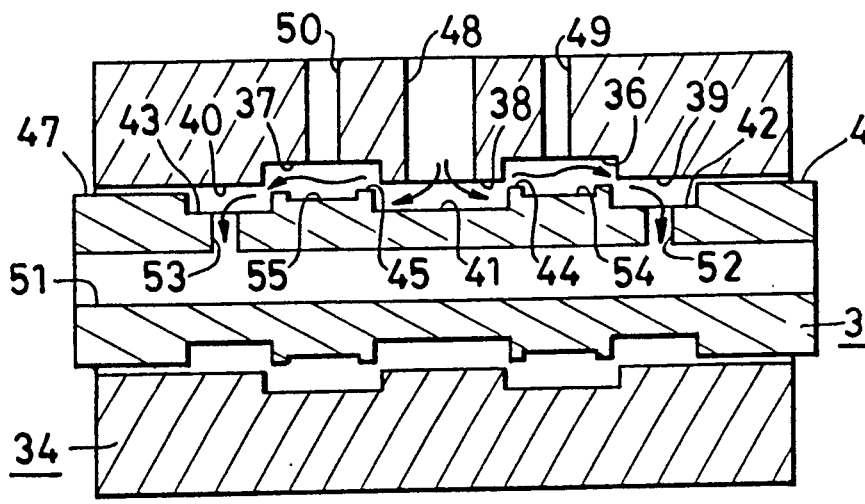
FIGS. 7 to 9 show an embodiment of spool-type hydraulic control valve.
Figure 8:
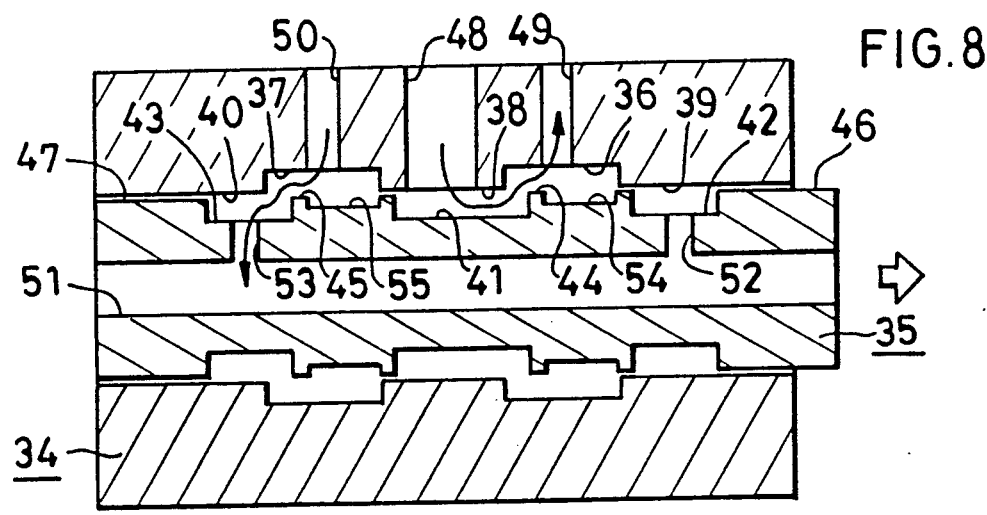
Figure 9:
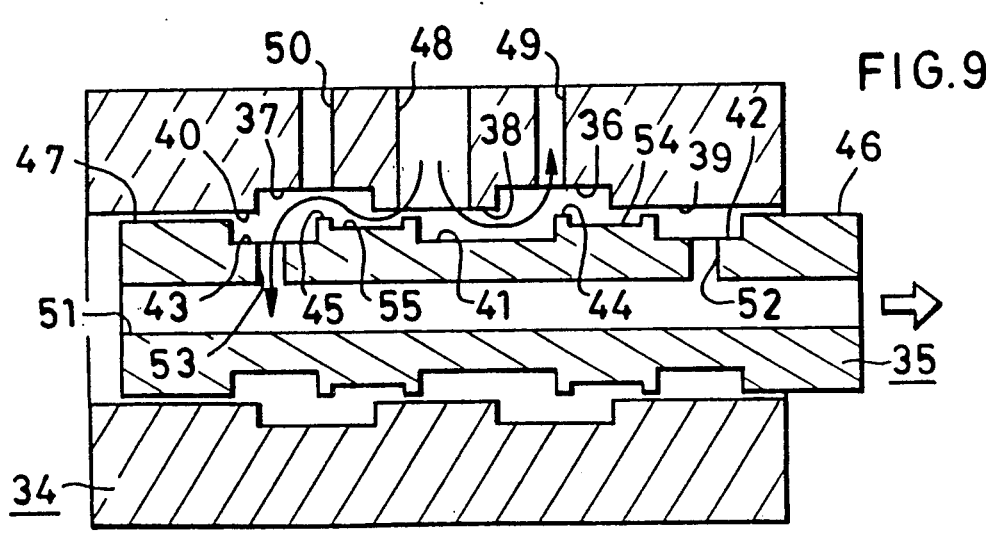

This embodiment is a hydraulic control valve of the spool type, which is shown in FIGS. 7 to 9.

The hydraulic control valve comprises a cylindrical casing 34, and a cylindrical valve member 35 fitted in the casing and movable axially thereof.

As disclosed, for example, in Examined Japanese Patent Publication SHO 57-61620, the casing 34 is fixed to the housing of a power steering device, or is formed integrally therewith although this arrangement is not shown. The valve member 35 is movable with a pinion shaft coupled to the steering wheel. When the steering wheel is turned rightward, exerting a twisting torque on the pinion shaft, the valve member moves rightward. The valve member moves leftward when the wheel is turned leftward to apply a twisting torque to the pinion shaft.

The inner periphery of the casing 34 is formed with an annular first groove portion 36 at its right side and with an annular second groove portion 37 at its left side. An annular first land portion 38 is formed between these land portions, and the right side of the first groove portion 36 serves as a second land portion 39, and the left side of the second groove portion 37 as a third land portion 40. The valve member 35 has an annular first groove portion 41 formed in the midportion of its outer periphery and opposed to the first land portion 38 of the casing 1, a second groove portion 42 positioned on the right side of the first groove 41 and opposed to the left-side portion of the second land portion 39 of the casing 34, and a third groove portion 43 positioned on the left side of the first groove portion 41 and opposed to the right-side portion of the third land portion 40 of the casing 40. The valve member further has a first land portion 44 positioned between the first groove portion 41 and the second groove portion 42 and opposed to the first groove portion 36 of the casing 34, and a second land portion 45 positioned between the first groove portion 41 and the third groove portion 43 and opposed to the second groove portion 37 of the casing 34. The right side of the second groove portion 42 serves as a third land portion 46 opposed to the right side of the second land portion 39 of the casing 34, and the left side of the third groove portion 43 provides a fourth land portion 47 opposed to the left side of the third land portion 40 of the casing 34.

The casing 34 is formed with an oil inlet port (oil inlet channel) 48 extending from the inner periphery of the first land portion 38 to the outer periphery thereof, a first oil outlet port (oil outlet channel) 49 extending from the bottom of the first groove portion 36 to the outer periphery thereof, and a second oil outlet port (oil outlet channel) 50 extending from the bottom of the second groove portion 37 to the outer periphery thereof. A first return oil bore (return oil channel) 51 extends through the center of the valve member 35 axially thereof. The first return oil bore 51 communicates with the second groove portion 42 via a radial second return oil bore (return oil channel) 52. The first return oil bore 51 communicates with the third groove portion 43 through a radial third return oil bore (return oil channel) 53. As in the prior art, the oil inlet port 48 is in communication a hydraulic pump, the first oil outlet port 49 with a first oil chamber of a steering force assisting hydraulic cylinder, the second oil outlet port 50 with a second oil chamber of the hydraulic cylinder, and the first return oil bore 51 with an oil tank although this arrangement is not illustrated.

Annular groovelike recesses 54, 55 are formed in the outer peripheries of the respective first land portion 44 and second land portion 45 of the valve member 35. The axial width of these recesses 54, 55 is larger than the width of the casing first land portion 38 from its axial opposite ends to the oil inlet port 48.

FIG. 7 shows the valve in a neutral state.

In this state, the first land portion 38 of the casing 34 is opposed to the first groove portion 41 of the valve member 35, the first groove portion 36 of the casing 1 to the first land portion 44 of the valve member 35, the second groove portion 37 of the casing 34 to the second land portion 45 of the valve member 35, the second land portion 39 of the casing 34 to the second groove portion 42 and the third land portion 46 of the valve member 35, and the third land portion 40 of the casing 34 to the third groove portion 43 and the fourth land portion 47 of the valve member 35. There is a clearance between the first land portion 44 of the valve member 35 and each of the casing first land portion 38 and second land portion 39 on opposite sides of the portion 44, and between the valve member second land portion 45 and each of the casing first land portion 38 and third land portion 40 on opposite sides of the portion 45. The oil supplied to the oil inlet port 48 from the hydraulic pump enters the first groove portion 41 of the valve member 35, flows through the first groove portion 36 and the second groove portion 37 of the casing 34 on opposite sides of the portion 41, then through the valve member second groove portion 42 and third groove portion 43 on opposite sides thereof and further through the second return oil bore 52 and the third return oil bore 53 in these portions, enters the first return oil bore 51 and returns to the tank. Accordingly, no pressure oil is supplied to the hydraulic cylinder, permitting the rack bar to remain in a neutral state and the motor vehicle in a straight running state.

FIG. 8 shows the state of the valve when the steering wheel is slightly turned rightward to slightly move the valve member 35 rightward relative to the casing 34.

In this state, the first land portion 44 of the valve member 35 blocks communication between the first groove portion 36 of the casing 34 and the second groove portion 42 of the valve member 35, and the second land portion 45 of the valve member 35 blocks communication between the second groove portion 37 of the casing 34 and the first groove portion 41 of the valve member 35, while the first groove portion 41 of the valve member 35 is in communication with the first groove portion 36 of the casing 34, with the third groove portion 43 of the valve member 35 communicating with the second groove portion 37 of the casing 34. The oil supplied to the first groove portion 41 of the valve member 35 from the oil inlet port 48 flows through the first groove portion 36 of the casing 34 and then through the first oil outlet port 49 and is fed to the first oil chamber of the hydraulic cylinder. On the other hand, the oil in the second oil chamber of the hydraulic cylinder flows through the second oil outlet port 50, the second groove portion 37 of the casing 34, the third groove portion 43 of the valve member 35 and the third return oil bore 53, enters the first return oil bore 51 and returns to the tank. Consequently, the rack bar moves in a direction to produce a rightward steering force and steers the motor vehicle rightward.

FIG. 9 shows the valve member 35 as moved further rightward relative to the casing 34 by further turning the steering wheel, for example, with the vehicle wheel trapped in a ditch.

At this time, the recess 55 in the second land portion 45 of the valve member 35 is moved into communication with the oil inlet port 48 of the casing 34. The pressure oil supplied to the oil inlet port 48 partly flows through this recess 55 into the second groove portion 37 of the casing 34, then flows through the third groove portion 43, the third return oil bore 53 and the first return oil bore 51 of the valve member 35 and returns to the tank. Consequently, the pressure of oil to be supplied to the first oil chamber of the hydraulic cylinder drops below a predetermined relief pressure to reduce the assisting steering force.

The valve operates in the same manner as above when the steering wheel is turned leftward.

Although the embodiments described above are adapted for use with power steering devices of the rack-pinion type, the valve of the present invention is similarly usable for other steering devices, for example, those of the ball screw type.

What is claimed is:

1. A hydraulic control valve comprising a casing having an oil inlet channel and an oil outlet channel and formed with groove portions and land portions arranged alternately in a specified direction, and a valve member having a return oil channel and attached to the casing so as to be movable relative thereto in the specified direction, the valve member having groove portions and land portions arranged alternately in the specified direction, the groove portions and the land portions of the casing being opposed to the land portions and the groove portions of the valve member respectively when the valve is in a neutral state, permitting oil supplied from the oil inlet channel to flow into the return oil channel, the valve member being movable from the neutral state relative to the casing for the land portions of the casing and the valve member to block communication between the oil inlet channel and the return oil channel to permit the oil supplied from the oil inlet channel to flow into the oil outlet channel, the hydraulic control valve being characterized in that the land portion of the casing or the valve member is formed with a recess for permitting the oil supplied from the oil inlet channel to flow therethrough into the return oil channel when the amount of movement of the valve member from the neutral state relative to the casing becomes greater than a predetermined value.

2. A hydraulic control valve as defined in claim 1 wherein the casing is in the form of a cylinder having the groove portions and the land portions formed on its inner periphery and extending axially thereof, and the valve member is in the form of a cylinder fitted in the casing and rotatable about its axis and has the groove portions and the land portions formed on its outer periphery and extending axially thereof.

3. A hydraulic control valve as defined in claim 1 wherein the casing is in the form of a cylinder, and the groove portions and the land portions are annular and formed on its inner periphery, the valve member being in the form of a cylinder fitted in the casing and movable axially thereof, the outer periphery of the valve member having annular groove portions and land portions.

* * * * *